F. L. BARBER.
COMBINED JOURNAL BEARING AND ROLLER SEAT.
APPLICATION FILED APR. 3, 1916.
1,241,186. Patented Sept. 25, 1917.
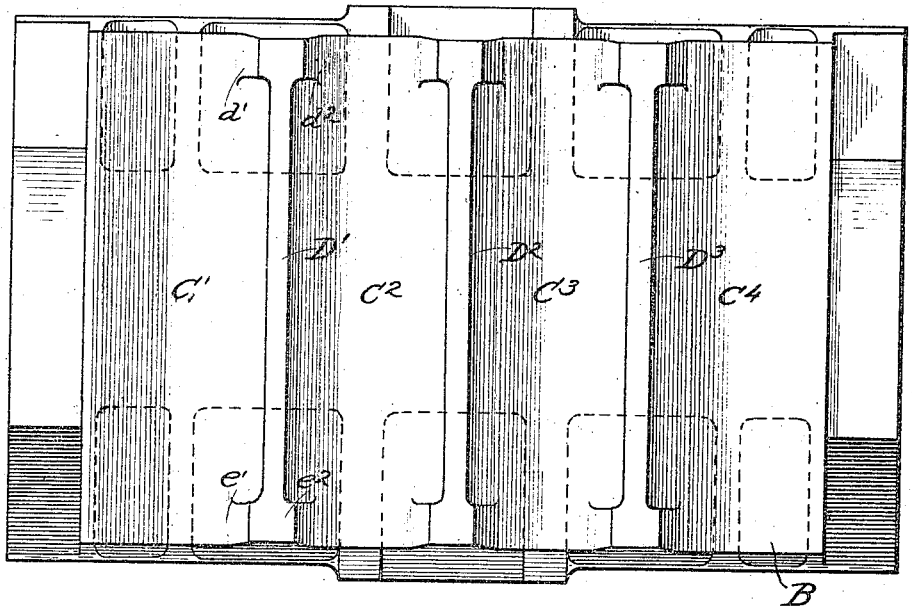
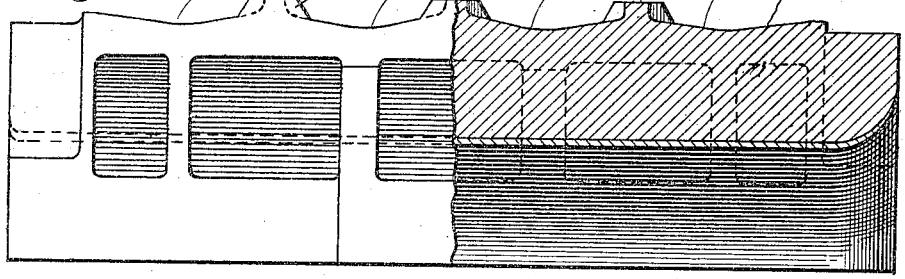
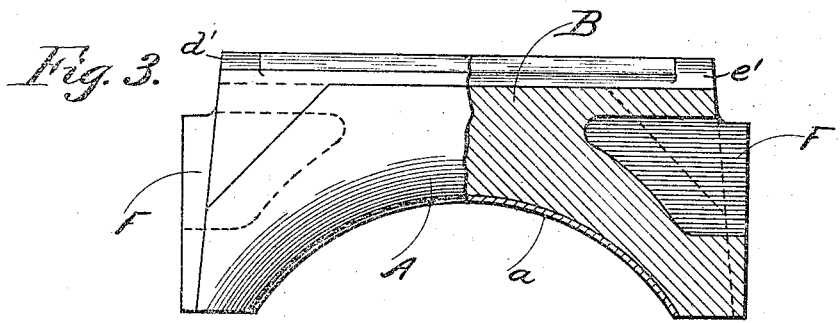
Witness:
Burnap
Inventor:
Franklin L. Barber
By Sheridan, Wilkinson & Scott, Att'ys

UNITED STATES PATENT OFFICE.

FRANKLIN L. BARBER, OF CHICAGO, ILLINOIS, ASSIGNOR TO STANDARD CAR TRUCK COMPANY, A CORPORATION OF NEW JERSEY.

COMBINED JOURNAL-BEARING AND ROLLER-SEAT.

1,241,186.

Specification of Letters Patent. Patented Sept. 25, 1917.

Application filed April 3, 1916. Serial No. 88,555.

*To all whom it may concern:*

Be it known that I, FRANKLIN L. BARBER, a citizen of the United States, residing at Chicago, in the county of Cook and State of Illinois, have invented certain new and useful Improvements in Combined Journal-Bearings and Roller-Seats, of which the following is a specification.

My invention relates in general to improvements in lateral motion journal boxes for car trucks, such, for instance, as covered by United States Patent No. 1,118,621 granted to me on November 24, 1914, and more particularly to a combined journal bearing and roller seat for such type of journal boxes.

In lateral motion journal boxes rollers are interposed between vertically alined seats in the under surface of the top of the journal box and in the upper surface of the journal bearing, or in a shell or plate supported thereon which corresponds to the usual wedge in ordinary journal boxes. The rollers permit a slight lateral movement of the journal box relative to the axle and thereby protect the wheel flanges from excessive wear incident to the tendency of the car box to swing laterally when curves in the track change the direction of movement of the cars. Heretofore it has been thought necessary to make the shell or wedge of malleable iron in order that the roller seats therein might be hard enough to withstand the wear of the rollers, and as the journal bearing must be made of bronze, the wedge and journal bearing were made separately and secured together, or the wedge was first cast of malleable iron and the bronze journal bearing then cast thereon. This practice involves considerable expense in making the castings and in assembling the wedges and journal bearings.

I have found by experiment that the bronze of which journal bearings are formed, instead of being too soft to be practical for use in forming the roller seats, as previously believed, is an excellent material for such seats, as under the action of the rollers it becomes harder, and consequently although it initially may not be quite as hard as malleable iron, yet in usage the action of the rollers serves to harden it and form superior roller seats. Although bronze is more expensive than malleable iron, yet it has a scrap value almost equal to its new value, while scrap malleable iron is practically without value, and hence the use of bronze to form the roller seats is no more expensive than the use of malleable iron, as the roller seats when worn out may be sold or used in making new roller seats.

The primary object of my invention is to provide a combined journal bearing and back or shell in which roller seats are formed for lateral motion car trucks formed in a single bronze casting so as to simplify the construction and reduce the cost of production of such parts.

A further object of my invention is to provide an integral combined journal bearing and roller seat for lateral motion car trucks which will be simple in construction, inexpensive in manufacture, durable in use, and efficient in operation.

My invention will be more fully described hereinafter with reference to the accompanying drawings in which the same is illustrated as embodied in a convenient and practical form, and in which,—

Figure 1 is a plan view;

Fig. 2 a view half in side elevation and half in vertical section; and

Fig. 3 a view half in elevation and half in cross-section.

The same reference characters are used to designate the same parts in the several figures of the drawing.

Reference letter A indicates a journal bearing the under-surface $a$ of which is curved to conform to the curvature of the axle journal upon which it rests. Formed integrally with the journal bearing A is a back or shell B in which are formed a plurality of roller seats $C^1$, $C^2$, $C^3$, and $C^4$, extending in planes transverse to that of the bearing surface $a$.

$D^1$, $D^2$, and $D^3$ designate ribs located between the adjacent roller seats, and from the opposite sides of which extend pairs of inclined lugs which serve as stops to limit the movement of the rollers upon the seats. Reference characters $d^1$ and $d^2$ designate the lugs on the opposite sides of one end of each of the ribs, and reference characters $e^1$, and $e^2$ designate the lugs on the opposite sides of the other end of each of the ribs.

The entire device, comprising the journal bearing and shell or back, having formed thereon the roller seats, is made of a single casting of bronze or other suitable material which possesses the requisite characteristics of a journal bearing, and also the necessary hardness to form durable roller seats. In order that the weight of the casting may be reduced without weakening its structural strength recesses F are formed in the opposite sides thereof intermediate of the curved undersurfaces a and the upper surface in which are formed the roller seats.

It will be noted that while I have lightened the structure by removing a considerable amount of metal, I have retained substantially the same strength by locating the wall of metal which separates the different openings at a point directly under the normal resting place of the rollers and by arching the metal between adjacent division walls. In effect I have provided, as best shown in Fig. 2, a series of trusses, the ends of which are supported on suitable abutments.

I have found in practice that although bronze may be initially softer than malleable iron, it is sufficiently hard to form efficient roller seats, inasmuch as the action of the rollers thereon increases its hardness. By my invention it is possible to form in a single casting the journal bearing and also the back or shell in which are formed the roller seats, thereby reducing the expense in manufacture and in assembling over that which has been heretofore necessary in making such parts for lateral motion car trucks.

What I claim is:—

1. In a lateral motion car truck, a combined axle journal bearing and roller seat formed in a single integral casting and comprising a curved undersurface conforming to the curvature of the axle journal, and roller seats formed in its upper surface.

2. In a lateral motion car truck, a combined axle journal bearing and roller seat formed in a single integral casting and comprising a curved undersurface conforming to the curvature of the axle journal, spaced recesses in the sides thereof intermediate its upper and lower surfaces, and roller seats formed in its upper surface.

3. A combined journal bearing and roller seat for lateral motion car trucks formed in a single integral bronze casting and comprising a curved undersurface corresponding to the curvature of the axle journal, and roller seats formed in its upper surface.

4. A combined axle journal bearing and roller seat for lateral motion car trucks formed in a single integral bronze casting comprising a curved undersurface conforming to the curvature of the axle journal, roller seats formed in its upper surface, and spaced recesses in its sides intermediate its upper and lower surfaces.

5. A bearing member composed entirely of the usual bearing metal and housing on its upper surface a plurality of roller seats, the metal in the body of the bearing being cored out at intervals, a wall between the spaces thus formed falling at the point of repose of rollers in said seats, substantially as described.

6. A bearing member composed entirely of the usual bearing metal and housing on its upper surface a plurality of roller seats, the metal at the sides of the bearing, intermediate the top and bottom thereof being cored out at intervals, substantially as described.

In testimony whereof, I have subscribed my name.

FRANKLIN L. BARBER.

Witnesses:
EDWIN W. WEBB,
CHAS. S. WALTON.

Copies of this patent may be obtained for five cents each, by addressing the "Commissioner of Patents, Washington, D. C."